VACUUM CONTROLLED AIR FILM

Filed June 14, 1965

INVENTORS
RAYMOND A. BARBEAU
DONALD K. CLOSE
KELLY B. DAY, JR
EDWARD J. WROBLEWSKI
JAMES A. WEIDENHAMMER
BY Bernard M. Goldman
ATTORNEY

VACUUM CONTROLLED AIR FILM

Filed June 14, 1965 3 Sheets-Sheet 2

United States Patent Office 3,327,916

Patented June 27, 1967

3,327,916
VACUUM CONTROLLED AIR FILM

James A. Weidenhammer and Raymond A. Barbeau, Poughkeepsie, Donald K. Close, Wappingers Falls, and Kelly B. Day, Jr., and Edward J. Wroblewski, Poughkeepsie, N.Y., assignors to International Business Machines Corporation, Armonk, N.Y., a corporation of New York Filed June 14, 1965, Ser. No. 463,727
25 Claims. (Cl. 226—97)

This invention relates to controlled air-film lubrication between moving flexible material and a flat surface. More particularly, this invention relates to means for controlling the precise thickness of an air lubricating film to an order of millionths of an inch.

Prior web bearings, such as described and claimed in U.S. Patent 3,151,796 require tape tension and an angle-of-wrap in relation to a particular bearing radius to control the lubricating air-film thickness. In such case, the air-film thickness varies as the web tension varies at any fixed web velocity. Furthermore, if the tension is made very small, or the radius is made large, the air-film thickness in such prior bearings becomes so great as to make the air bearing useless in its very important application of lubricating magnetic tape while it is being read or written by a read or write head.

The subject invention involves a novel principle of operation which eliminates both the tension requirement and the angle-of-wrap requirement found with prior web air bearings. Furthermore, the subject invention obtains a greater precision in the control of air-film thickness than was obtainable by prior air bearing devices.

Although air is the bearing medium of primary usage with this invention, it is recognized that this invention can use any gas instead of air, and that all gases are equivalents for the purposes of this invention.

It is, therefore, an object of this invention to provide:

(1) A gas bearing providing a lubricating gas film with a uniform thickness over any required length of flexible material being supported by the bearing.

(2) An air bearing which can be totally flat and which has an opposing bearing surface that can be totally flat and without rounded edges.

(3) A lubricating air bearing in which tension on the flexible material urges it *away* from an opposing solid bearing surface.

(4) An air bearing for flexible materials in which tension on the material does not urge the material toward a solid opposing bearing surface.

(5) An air bearing in which damping occurs for any oscillating characteristics of a flexible material being supported which might affect the lubricating air-film thickness.

(6) An air bearing in which the lubricating air-film thickness is controllable to an order of millionths of an inch.

(7) An air bearing which provides ideal operation between magnetic tape and a magnetic head.

(8) A lubricating air bearing that causes less wear under start and stop conditions to both the flexible material and its opposing solid bearing, when compared to the wear of prior hydrodynamic web bearings under similar condtions.

(9) An air bearing which under stopped web conditions involves only a small net force of a web against a rigid bearing surface as a result of a normal-operating vacuum, when compared to the net force of prior hydrodynamic air bearings urging a stopped web against a solid bearing surface.

(10) An air bearing which under stopped or moving web conditions can displace a web further away from an opposing solid surface than the controlled lubricating air-film thickness by removing a vacuum applied to the solid surface.

(11) An air bearing which permits a constant lubricating air-film thickness at different velocities of a flexible material in relation to an opposing solid surface.

(12) A lubricating air film for a web wherein the air-film thickness can be easily and precisely controlled independently of web velocity by controlling an applied pneumatic pressure from a vacuum source.

(13) An air bearing between a web and an opposing solid surface that can contain one or a plurality of magnetic head gaps flush with the surface of the solid surface at any location within an area that can be made as large as required.

(14) An air bearing between a web and a solid surface in which the location of any magnetic head gap is not fixed by the geometry of the solid surface, as was the case with prior radius-type hydrodynamic bearings.

(15) An air bearing over a flat solid surface which can support magnetic heads at positions solely dependent upon head characteristics rather than upon structural characteristics of the solid surface.

(16) A precise air-lubricated magnetic head to tape relationship wherein a lubricating air-film thickness can be controllably increased for rapid wind or rewind of tape by merely shutting off a vacuum port.

(17) An air bearing for magnetic tape having an inherent vacuum-cleaning action for the tape being read or written.

(18) An air bearing which can operate with a web moving in one or plural directions.

The structure of this invention includes a flat solid surface opposite a flexible material which is movable relative to the solid surface. One or more vacuum ports are provided through the solid surface near its leading edge. (The leading edge is the edge of the solid surface which first receives incremental areas of the moving flexible material.) The flexible material is normally supported substantially parallel to the solid surface and at a distance from it greater than the required thickness of the lubricating air-film.

The foregoing and other objects, features and advantages of the invention will be apparent from the following more particular description of the preferred embodiments of invention as illustrated in the accompanying drawings.

Figure 11A:
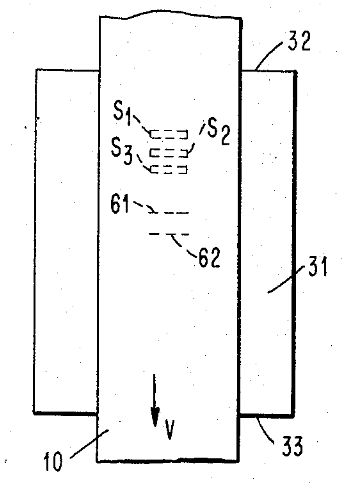
Figure 12:
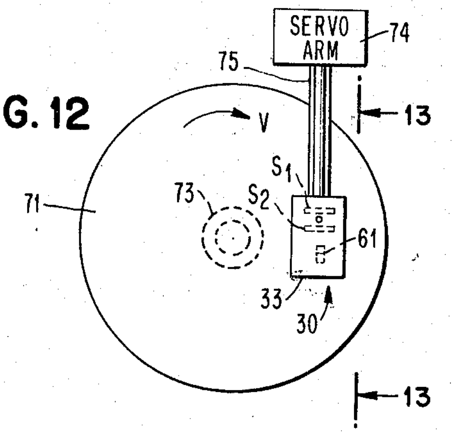
Figure 13:
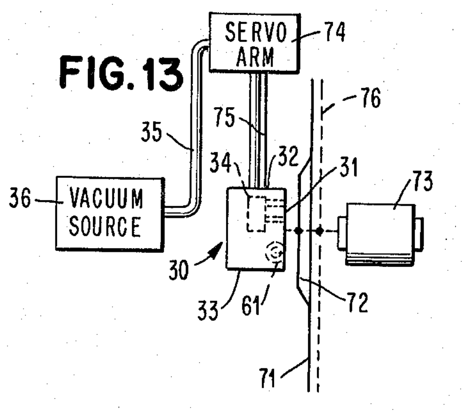

FIGURES 11A, B and C illustrate top views of different embodiments of the invention; and FIGURES 12 and 13 illustrate an adaptation of the invention to a flexible rotating disk environment.

Figure 1:
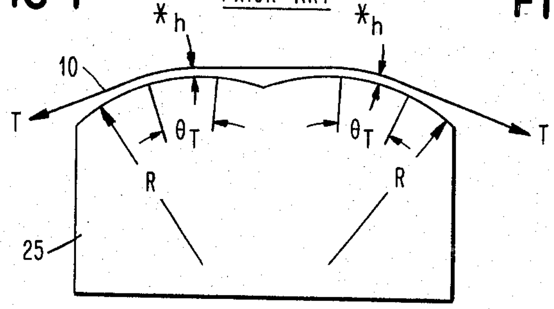
FIGURES 1 and 2 show the closest known background prior art to the subject invention.
Figure 2:
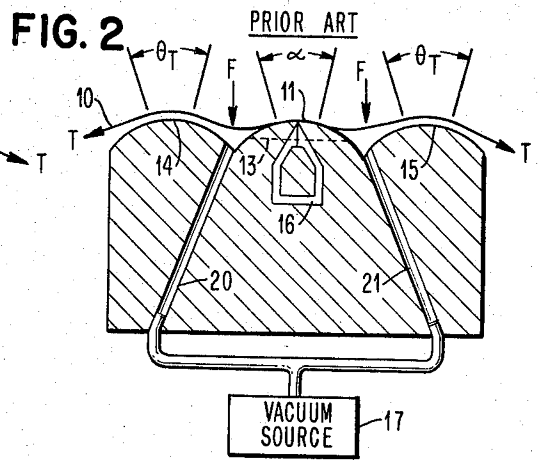

The invention utilizes a different principle of operation from that utilized by prior hydrodynamic air bearings. In order to assist a fundamental understanding of this distinction, FIGURES 1 and 2 are provided to explain the prior art principles as background for comparative purposes before going to the first embodiment of the subject invention. FIGURE 1 is representative of U.S. Patent 3,170,045 to Baumeister et al., titled, "Hydrodynamically Air Lubricated Magnetic Tape Head." FIGURE 2 is representative of U.S. Patent 3,151,796 to Lipschutz titled "Web Feeding Device," both patents being assigned to the same assignee as the present invention.

FIGURE 1 shows a prior air-lubricated configuration used with magnetic heads; and it is sometimes known as the "radius head." The illustrated configuration permits the mounting of two heads sequentially in each track. One head is mounted within each wrap angle sector $\theta_T$ in which an air-film thickness $h^*$ is obtained as long as the tape is moving at a fixed velocity V, with the fixed angle-of-wrap $\theta_T$, and with a fixed tape tension T. In FIGURE 1, tape 10 is being moved at a velocity V over a rigid member 25 having a two radius configuration, wherein each radius R defines half the rigid bearing surface adjacent to tape 10. Tape 10 has a tension T applied to its opposite ends, for example, by vacuum columns (not shown). The tape path is chosen to obtain the angle-of-wrap $\theta_T$ about each of the two rigid surface radius portions of member 25. As the tape moves at a fixed velocity V with tension T over each radius R, air-film thickness $h^*$ is obtained between tape 10 and the rigid surface of member 25 within each wrap angle $\theta_T$. The inter-relationship of these parameters is represented by the following formula:

$$h^*=\frac{R\theta_T}{33.7}\left(\frac{6uV}{T}\right)^{1/3} \qquad (1)$$

in which:

$h^*$ is the air-film thickness at the center of the angle-of-wrap $\theta_T$.
R is the radius of the rigid bearing surface.
$\theta_T$ is the angle-of-wrap of the web about the rigid bearing surface.
T is the longitudinal tension on the web.
V is velocity of the web relative to the rigid bearing surface.
$u$ is viscosity of air (or any other working fluid).

It, therefore, appears from the above formula that as the radius R becomes larger, the air-film thickness $h^*$ becomes greater. Thus, as R approaches infinity (representing a flat surface), $h^*$ becomes very large.

Furthermore, in FIGURE 1, the location of a magnetic head gap is restricted to within an angle-of-wrap $\theta_T$, since that is the only place where the predetermined air film spacing $h^*$ is obtained.

In prior art FIGURE 2, a tape 10 is moved at a velocity V over a rigid surface having three radius sectors 14, 15 and 11. Outer sectors 14 and 15 provide an air-lubricated radius bearing of the type described with respect to FIGURE 1. However, sector 11 provides in-contact engagement with tape 10 over an angle-of-wrap $\alpha$, controlled by the amount of an applied vacuum. A plurality of slots 13 are formed across the surface of radius 11 in direction of movement of tape 10. Slots 13 are provided on the opposite side of each tape-engaging gap of a magnetic head 16. Slots 13 break down the air-film lubrication between tape 10 and sector 11 when vacuum is applied by means of a vacuum source 17 through ports 20 and 21 to the air volumes under the tape 10 on the opposite sides of sector 11. The vacuum sucks the air from within slots 13 and on opposite sides of radius 11 to obtain angle-of-wrap $\alpha$, due to the force F applied to the tape by the partial vacuum on the opposite sides of radius 11. The force F also increases the angle-of-wrap $\theta_T$ about each of the radius bearings 14, 15.

Figures 3, 4:
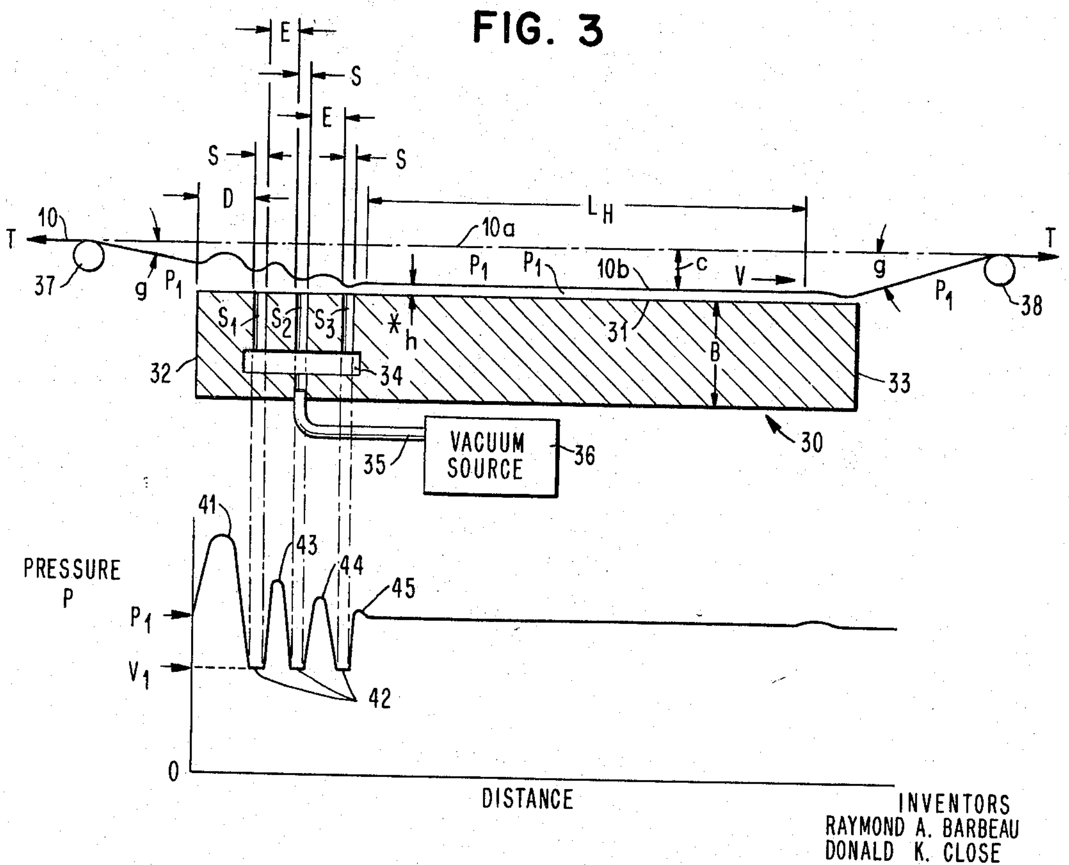
FIGURES 3, 5, 6, 7, 9 and 10 illustrate cross-sectional views of plural embodiments of the subject invention.
FIGURES 4 and 8 show waveforms used in explaining the operation of the invention.

FIGURE 3 shows an embodiment of this invention which includes a flat surface 31 on a body 30. A tape 10 moves between supports 37 and 38 at a velocity V (in the direction of the arrow) over surface 31. Body 30 has a leading side 32 which first sees the received areas of tape and the tape leaves from a lagging side 33.

A plurality of vacuum slots $S_1$, $S_2$, $S_3$ are transversely formed through the surface 31 into body 30. The slots are connected in common by means of a common chamber 34 to a vacuum source 36 which communicates through a tubular opening 35 and external tubing to vacuum source 36. Each slot $S_1$, $S_2$ and $S_3$ has a width S that is sufficiently small that the web cannot be injured under any operating condition such as if the vacuum attempts to suck in the web when it is stopped. The transverse length of each slot is determined by the width required for the air bearing. The vacuum from source 36 need not be great, for example, it may be only a few inches of water. The first slot $S_1$ is spaced by a distance D from the leading end 32. The spacing between plural slots is E.

Supports 37 and 38 may be any type, such as roller idlers, blowing air lubricated fixed supports, fixed hydrodynamically lubricated supports, etc. The tape is drawn between supports 37 and 38 with a tension T.

When the tape is not moving, and no vacuum is applied from source 36, the tape assumes a straight line position 10*a* between supports 37 and 38.

When vacuum is applied to the slots and the tape is moved at velocity V, the moving tape acquires the static form represented by a second tape path 10*b* between supports 37 and 38. The movement of the tape downwardly from its initial stationary straight-line position 10*a* to its moving position 10*b* involves a displacement C, which may be only a few thousandths of an inch. Accordingly, the tape pivots by a small angle $g$ about each support 37 and 38. Angle $g$ may be called an angle-of-approach, or an angle-of-exit, as the case may be. A positive angle $g$ is shown in FIGURE 3. For example, angle $g$ may be about +0.005 radian. However, if angle $g$ is made negative, radii such as 135 and 136 in FIGURE 10 should be added to the leading edges. The size of the radii 134 and 135 combine with the amount of vacuum applied to the slots to control spacing $h^*$. The most pertinent art known in this respect is IBM assigned application, Ser. No. 420,602 filed Dec. 23, 1964 to Berghaus et al. The spacing $h^*$ can be finely controlled at different tape velocities by correspondingly changing the vacuum applied to the slots. For start and stop tape operation, tape wear is greater when angle $g$ becomes negative, involving an angle-of-wrap about the head, than is found when angle $g$ is positive as shown in FIGURE 3.

For the sake of explanation and drawing practicality, it is necessary in FIGURE 3 to represent the tape position and contours with greatly exaggerated proportions. Thus, for example, C may be three or four thousandths of an inch, $h^*$ may be 15 millionths of an inch, and thickness B for rigid member 30 may be any amount such as one-half inch.

The operation of the embodiment in FIGURE 3 can be better understood with the use of the following expression:

$$k=\frac{T}{P-P_1} \qquad (2)$$

$k$ is the radius of curvature on the web at any point fixed in relation to the opposite rigid bearing surface.
T is the tension on the web.
$P_1$ is the ambient pressure on one side of the web at the fixed point.
P is the pressure on other side of web at the fixed point.

It is emphasized in using expression 2 that $k$ is the radius of an incremental length of moving tape at a point fixed relative to surface 31. Thus, the radius $k$ is applicable to a static flexure in the moving web due to a differential pressure acting across it while the web is under tension T. Radius $k$ varies as the differential pressure on the web varies along its length.

An important characteristic observed from expression 2 is that when pressure P on one side of the tape equals the ambient pressure $P_1$ on the other side of the tape, the radius $k$ becomes infinite, i.e., the tape moves in a straight line whenever the pressures are equal on its opposite side.

Thus, in FIGURE 3, the top side of the tape always has ambient pressure $P_1$, which is assumed in this example to be atmospheric pressure. Initially, as the tape moves from support 37 toward leading edge 32, pressure $P_1$ exists on both sides of the tape; and it there must move in a straight line. As the tape is moving, its surface frictionally engages air molecules and tends to carry them along. After the tape passes the leading edge 32 of surface 31, the surface friction of the moving web pumps air between surface 31 and tape 10, which causes a rise in pressure P underneath the tape as it initially moves over surface 31; and a bulge in this area of tape results. FIGURE 4 shows the differential pressure relationship $(P-P_1)$ on the tape as it moves past surface 31. Thus, in FIGURE 4, the initial rise in pressure P is represented by peak 41 due to the air moving with the tape and being received at the leading edge of surface 31. Shortly thereafter, the tape feels the effect of the partial vacuum created by air moving into slots $S_1$; which creates the partial vacuum pressure 42 in FIGURE 4 at this point beneath the tape. The contour of the tape at this point is hence affected according to expression 2. Between each pair of adjacent slots, partial pressure rises 43 and 44 occur with intervening partial vacuums 42 caused by each respective slot. After the last slot, a small pressure rise 45 occurs due to the air movement action; and this pressure is quickly neutralized by a slight tape movement transverse to the plane of surface 31 until the pressures $P_1$ and P become equal on the opposite sides of the tape. This equalization occurs when the tape has moved only 10 to 20 thousandths of an inch from the last slot. Thereafter, for a distance $L_H$ along the surface 31, the tape maintains the constant air-film spacing $h^*$ from surface 31. This is because the tape must move in a straight line due to equal pressures existing on its opposite sides as previously explained in regard to expression 2. Just as the tape is about to leave surface 31 at trailing edge 33, an end-effect pressure disturbance across the tape is created, which slightly disturbs the spacing $h^*$ at 10 to 20 thousandths of an inch from end 33. Very shortly after leaving end 33, the pressure on opposite sides of the tape again becomes equal at ambient $P_1$. Hence, the tape moves in a straight line up to pivot 38.

In this manner, the tape has moved with a constant and stable spacing $h^*$ for a distance $L_H$, that can be made as long as desired by merely extending surface 31 as long as desired.

The parameters D, E, S and the number of slots each have an effect upon the air-film thickness $h^*$.

Figure 9:
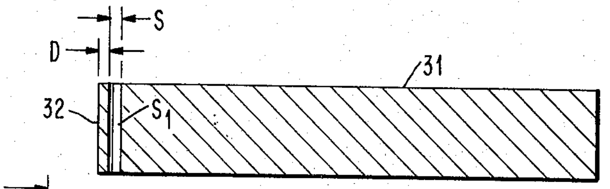
Figure 10:
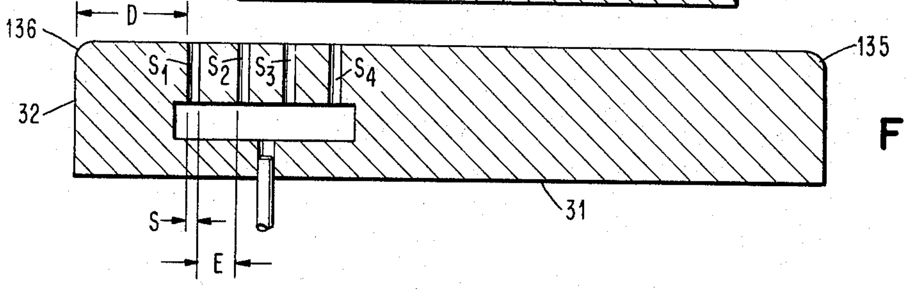

The embodiment in FIGURE 9 shows only a single slot $S_1$, while the embodiment in FIGURE 10 shows four slots $S_1$, $S_2$, $S_3$ and $S_4$. It has been found experimentally that for slots with a particular slot width S to obtain a given air spacing $h^*$, that dimension D can become greater as the number of slots is increased. The dimension E between plural slots is not particularly critical. When only a single slot $S_1$ is used, dimension D should be small to avoid a high pressure buildup that would interfere with control of web spacing $h^*$. It has been found easier in practice to make the invention with a large dimension D and plural slots rather than with only a single slot. When the number of slots becomes four or more, dimension D can be made as large or as small as required.

Also, it is preferable that a slot be used rather than a plurality of holes, because a slot obtains a more uniform partial vacuum pressure with respect to that width of a web over which is required a uniform spacing $h^*$. Also, small holes tend to become clogged more easily than a slot. Nevertheless, they can theoretically be used.

FIGURES 11A, B and C illustrate different lengths (transverse to the web) for slots in a plurality of different situations where the air bearing is being used to lubricate a moving magnetic tape 10 being read or written by head gaps at different locations on surface 31.

In FIGURE 11A, a pair of head gaps 61 and 62 are provided for a single tape track; wherein gap 61 might be a write head gap and gap 62 might be a read-head gap. In this case, the three vacuum slots $S_1$, $S_2$ and $S_3$ precede the head gaps 61 and 62 and have a slot length which is equal to or slightly greater than the width of gaps 61 and 62. The gaps 61 and 62 are, therefore, located behind the slots along the length $L_H$. Thus, the portion of tape 10 over gaps 61 and 62 is spaced $h^*$ from tape 10; but the outer edges of tape 10 (not applicable to the head gaps) are spaced greater than $h^*$ from surface 31 since the edges do not feel the full force of the vacuum from the slots pulling them toward surface 31.

Figure 11B:
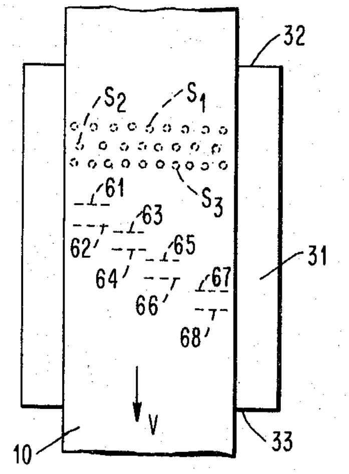

In FIGURE 11B, an arrangement of head gaps is shown which are staggered among plural tape tracks. Thus, gaps 61 and 62 apply to one track, 63, 64 to a second track, 65 and 66 to a third track, and 67 and 68 to a fourth track. In this particular case, rows of holes $S_1$, $S_2$ and $S_3$ are alternatively used instead of the vacuum slots $S_1$, $S_2$ and $S_3$. The rows of holes have a length equal to the width of tape 10, so that the entire cross section of tape 10 has a spacing $h^*$ from surface 31 for the distance $L_H$. The varying distance of head locations behind the rows of holes in FIGURE 11B is permitted by the fact that with this invention $h^*$ is obtained over the extended area $L_H$ behind the rows of holes.

Figure 11C:
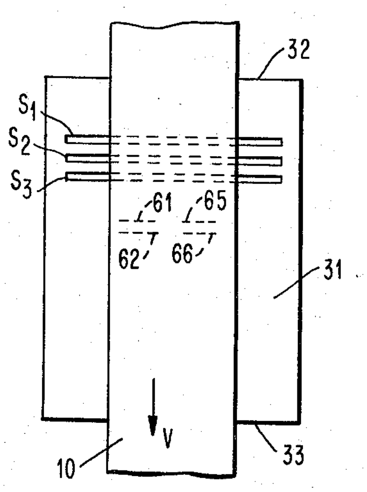

FIGURE 11C shows the vacuum slots $S_1$, $S_2$ and $S_3$ having a length substantially greater than the width of tape 10. In this example, the head gaps are located with a side-by-side arrangement. In FIGURE 11C, the surface 31 is designed to operate with different widths of tape 10. Hence, it can obtain the constant spacing $h^*$ for any width of tape less than the length of the slots. Different tape widths require different vacuum level adjustments to maintain $h^*$ equal. In the case where the tape contains more tracks than heads shown, relative lateral movement between head and tape enables all tracks to be accessed without change in vacuum.

The embodiments described thus far show a web having the configuration of an elongated web or strip of flexible material. Other configurations can also be used. FIGURES 12 and 13 show an embodiment involving a rotating flexible web represented by a rotating flexible disk 71 which is centrally connected to a motor 73, to which is also connected a plate 76 having a plurality of perforations therethrough over its entire surface. The rotating plate 76 stabilizes generally the position of disk 71. In this particular case, a head 61 has its gap mounted flush with the surface 31 behind slots $S_1$ and $S_2$, as previously described. The head is mechanically supported in rigid body 30 by a servo arm 74 of the conventional type used with disks and arm 74 is connected to member 30 by means of support 75. Servo arm 74 may be of the type commonly used on commercial disk files such as the IBM 1405 or 1311 disk file. A vacuum source 36 is connected by means of tubing 35 through the arm and support to the common vacuum chamber 34 that communicates with all the vacuum slots. In operation, a slight bulge occurs in surface of the disk adjacent to surface 31 to obtain a spacing $h^*$ between a portion of the disk surface and surface 31. The air-lubricated film spacing $h^*$ for the head will vary somewhat with the utilized radius of disk 71 as the velocity V changes as a function of the radius of the disk being used by the head gap 61. Often $h^*$ under this condition varies by perhaps a two-to-one factor which is generally tolerable. In those cases where the velocity variation causes $h^*$ to vary beyond tolerable limits, it can easily be controlled by varying the vacuum to the slots as a function of the radius as determined by the position of arm 74, either its angle or length, as the case may be.

The embodiments discussed thus far describe a web moving with a velocity V in one direction with respect to a smooth but rigid bearing surface 31. With magnetic tape transport operation, single-direction control for $h^*$ can be used in those cases where reading and writing is done with one direction of movement for the tape. In such case, rewind is accommodated by merely shutting off the vacuum; in which case the tape moves further away from surface 31 to position 10*a*. In fact, in situations where position 10*a* is only a few thousandths of an inch from surface 31, the high velocity of rewind may move tape even further away from surface 31 than position 10*a*. Where some type of read head sensing is needed in the reverse tape direction, it can be done by recording marker signals on the tape at a low density to be sensed by the head while it is spaced from the tape by the substantial distance C.

Figure 5:
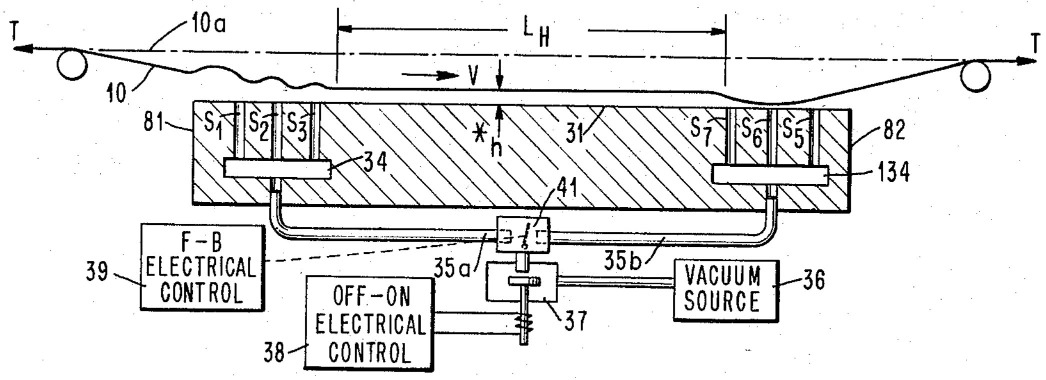
Figure 6:
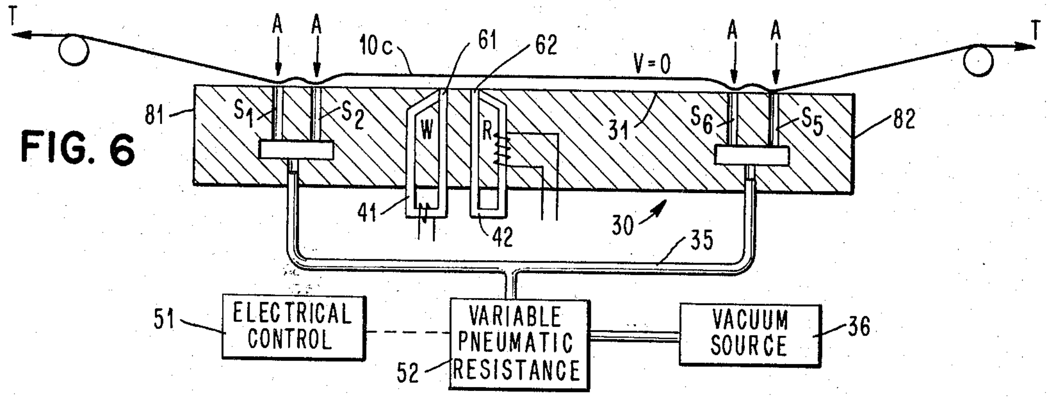
Figure 7:
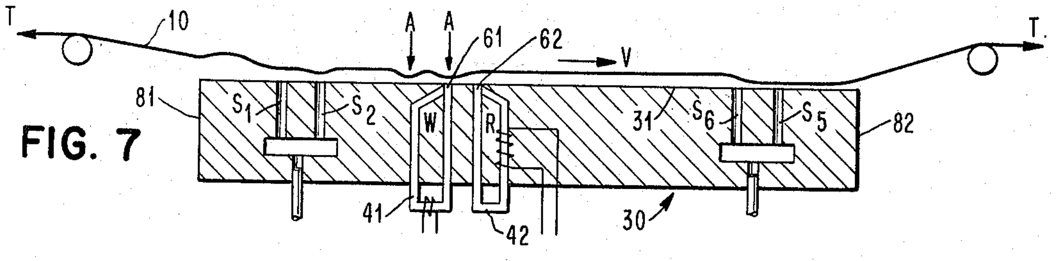

FIGURES 5, 6 and 7 show embodiments of the invention which obtain a web spacing $h^*$ from surface 31 with either backward or forward direction of tape movement. Thus, in FIGURE 5, two sets of plural slots are provided adjacent to opposite ends 81 and 82 of the flat surface 31. In this case either end 81 or 82 may be a leading end for a particular direction of tape movement. In FIGURE 5, the size of the slots and the location of the slots from each leading end of surface 31 is determined in precisely the same way as was determined for the embodiment in FIGURE 3. Thus, 81 is the leading end for slots $S_1$, $S_2$ and $S_3$; while 82 is the leading end for slots $S_5$, $S_6$ and $S_7$.

Also shown as a separate feature in FIGURE 5 is a valving arrangement for switching the vacuum to the slots. A valve 41 is provided for connecting vacuum source 36 to either vacuum chamber 34 or 134 through tube 35*a* or tube 35*b*, according to the setting of a forward-backward electrical control 39, which can be automatically controlled by the forward-backward trigger found in presently marketed IBM tape controls. A second valve 37 is provided as an off-on connection of the vacuum source to the tubes 35*a* and *b*. Accordingly, when the tape is being rewound, or when there is no particular need for having the spacing $h^*$, control 38 may be used to shut off the vacuum entirely; and for example, it can be automatically controlled by the rewind trigger or tape-go trigger found in presently marketed IBM tape controls.

In many cases, the added vacuum control obtained by valves 41 and 37 is not needed; and in such case, vacuum source 36 is directly connected to tubes 35*a* and *b*. The effect of not having means for shutting off the vacuum under the stopped tape condition is represented by tape position 10*c* in FIGURE 6; wherein there is no relative motion between tape 10 and surface 31; i.e., velocity V is zero. With the normal vacuum source pressure being applied to the tape in the stopped case, the tape is sucked by a force A against the top of each vacuum slot. Since each slot has a very small width S, the tape cannot be sucked into the slot and the slot does not significantly deform the tape. Yet minute dimples may occur on the surface of the tape at the respective slots as shown in FIGURE 6. These dimples actually represent only a deformation of the order of a few one millionths of an inch. The section of stopped tape along length $L_H$ does not touch surface 31 because of captured air therebetween. If the vacuum is not applied to the trailing edge set of slots, no dimples occur there; and then they only occur at the leading edge set of slots to which vacuum is applied. If the vacuum to all slots is turned off when the tape is stopped, no dimples result.

Figure 8:
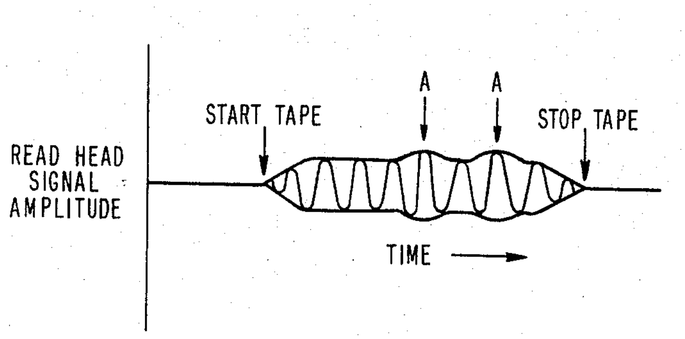

FIGURE 7 illustrates the tape of FIGURE 6 shortly after it has begun to move. Dimple A has moved about one third of the way along length $L_H$. Thus, dimple A causes a small length of the tape to be closer than $h^*$ to surface 31 but not in contact with it. The effect of dimple A upon a sensed signal output is represented in FIGURE 8 as the sensed signal from a read head 42. Head 42 is supported substantially within member 30, and it is preceded by a write head 41 similarly supported within member 30. The gaps 61 and 62 in surface 31 were previously discussed. The signal output from read gap 62 has the amplitude bulge, shown in FIGURE 8, caused by the signal from the dimple A. The amplitude bulge is slight and very momentary in the detected amplitude of the constant amplitude signal recorded throughout the length of tape being read. Initially, in FIGURE 8, the detected signal rises in amplitude as the velocity of the tape increases to normal velocity and drops back to zero when the tape is stopped. Any conventional tape drive may be used, such as for example, the tape feed mechanism shown in J. A. Weidenhammer et al., Patent 3,057,569.

When vacuum is applied to both backward and forward sets of slots when the tape is moving in a particular direction, the tape at the slots near the trailing end of surface 31 is drawn closer to surface 31 than $h^*$, but not in contact therewith. Where this decrease in spacing is considered undesirable, the forward-backward electrical control 39 with forward-backward valve 41, shown in FIGURE 5, is used. In such case, the forward-backward valve control permits operation to be substantially the same as that described in conjunction with FIGURE 1.

In some situations, it is desirable to have multiple velocities available for a magnetic tape, but it is also required to have the same $h^*$ spacing for each different velocity. FIGURE 6 shows how this ian be done by using a variable pneumatic resistance 52 which may be connected between vacuum source 36 and the respective slots. In such case, an electrical control 51 is connected to variable pneumatic resistance 52 to control the amount of resistance required at any particular velocity V to maintain $h^*$ constant. In order to maintain $h^*$ constant, pneumatic resistance 52 is decreased for increased velocities.

Electrical control 51 is not needed in those cases where different available velocities become fixed once chosen; in which case different resistance inserts can be applied within resistance 52.

Another use for variable resistance 39 in a magnetic tape drive is to increase the likelihood of recovery of a below minimum sensed signal level. Upon sensing a signal drop-out error, the tape portion is reread with more vacuum applied to the slots, such as by decreasing pneumatic resistance 52. This causes the tape to be reread with a smaller spacing $h^*$, that results in higher sensed output signals, particularly at high digital tape densities, such as densities in excess of 1000 bits per inch.

This invention is also operable and hereby includes the situation in which surface 31 is not flat but is continuous and smooth, that is, uniform changes in surface contour are permissible without breaks in contour. A break in contour of surface 31 adversely affects operation.

It is not necessary that there be any relationship between the angle *g* of approach and the angle *g* of exit. For example, the angle *g* of approach may be negative, zero or positive; while the angle *g* of exit may be independently any one of positive, zero or negative. For example, it is possible to operate with a negative angle *g* of approach and a zero angle *g* of exit. A negative angle *g* of approach is more preferable for the continuous type of operation situation than for the start-stop type of operation. If the tape must start and stop, the tape will rub at either the leading or trailing edge which has a negative angle *g*.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. Means for controlling an air lubricating film spacing over a selected area between a moving web and a body, comprising said body being formed with a smooth and continuous surface, first and second web supports located oppositely with respect to said selected area, said web supports being capable of supporting said web in a straight line away from said surface by a distance greater than a controlled thickness for said air film for the moving web;

at least one port formed through the surface of said body adjacent a leading side of said selected area, means for applying a lower than ambient pressure to said port, said pressure means being controllable to a value within a range that obtains a substantially uniform spacing over said selected area, and a contour for said flexible material being shaped by said vacuum pressure to obtain said uniform spacing over said selected area.

2. Means for controlling an air film spacing as defined in claim 1 in which at least one gap for a magnetic head being formed flush with said surface and being located anywhere within said selected area.

3. Air film control means as defined in claim 2 in which pressure control means is provided for selectively applying pressure to either said first or said second ports.

4. Air film control means as defined in claim 2 in which means is provided for selectively removing said pressure from both of said ports.

5. Air film control means as defined in claim 2 in which additional ports are provided outside of said selected area adjacent to said first and second ports.

6. Air film control means as defined in claim 5 in which said ports comprise a plurality of narrow slots arranged parallel to each other.

7. Air film control means as defined in claim 1 further having at least one second port being provided adjacent the other side of said selected area, means for applying said lower than ambient pressure to said second port, and a least one head gap formed flush with said selected area between said ports.

8. Means for controlling an air lubricating film spacing over a selected area between a moving web and a body, comprising said body being formed with a smooth and continuous surface, at least part of said surface being said selected area, a pair of web supports located oppositely with respect to said body, said body having a leading edge and a trailing edge, respectively, in respective proximity to said supports, at least one port formed through the surface of said body preceding said selected area, means for applying a lower than ambient pressure to said port, means for controlling said pressure to a value to obtain said spacing uniformly over said area in the order of micro-inches during relative movement, said web making an angle of approach from one of said web supports to said leading edge, said web making an angle of exit from said trailing edge to said other web support, and said angle of approach being independent of said angle of exit.

9. Air film control means as defined in claim 8 in which said angle of approach being any one of positive zero and negative angles, and said angle of exit being any one of positive zero and negative angles.

10. Air film control means as defined in claim 9 further having a radius being formed on at least one of said edges.

11. Means for precisely controlling the spacing between a body and a flexible material, with relative movement between them, to obtain a controlled lubricating gas film between them, comprising a smooth area on said body, gas volume reduction means being located at a leading boundary of said smooth area, the spacing of said material from said area being uniform over said area behind said gas volume reduction means to provide said controlled lubricating gas film, and a curved contour formed dynamically in said flexible material out-of-contact with said body and adjacent to said gas volume reduction means by gas withdrawal through said ags volume reduction means during the relative movement.

12. Means for precisely controlling the spacing between a body and a flexible material as defined in claim 11, in which a flux sensor is embedded in said smooth surface.

13. Means as defined in claim 12 in which a magnetic sensor provides said flux sensor, and magnetic tape provides said flexible material.

14. Means for precisely controlling the spacing between a body and a flexible material as defined in claim 11, in which the pneumatic pressure is substantially equal and uniform on opposite sides of said flexible material over said controlled lubricating gas film.

15. Means for precisely controlling the spacing between a body and a flexible material as defined in claim 11, in which the pneumatic pressure is substantially equal and uniform on opposite sides of said flexible material over said controlled lubricating gas film.

16. Means for precisely controlling the spacing between a body and a flexible material, with relative movement between them, to obtain a precisely controlled air film, comprising a smooth surface area on said body, means for moving said flexible material over said smooth surface area, air volume reduction means formed through said body at a leading boundary of said smooth surface area, said air volume reduction means receiving a portion of the air otherwise carried by said flexible material between it and said body to form said controlled air film, a curved contour formed in said flexible material adjacent to said air volume reduction means but out-of-contact with said body during the relative movement.

17. Means for precisely controlling the spacing between a body and a flexible material having relative movement as defined in claim 16 in which said smooth surface area is flat, and a uniform pressure is provided within said controlled air film between the flexible material and the smooth surface area.

18. Means for precisely controlling the thickness of a gas film between a body and a flexible material having relative motion, comprising a continuous surface formed on said body, at least one effective opening formed through said body prior to said continuous surface, means for applying a lower-than-ambient gas pressure to said opening, said lower-than-ambient gas pressure having a value between an ambient pressure and a higher vacuum pressure providing contact of said flexible material with said body during relative motion, a curved contour being formed in said flexible material immediately prior to said controlled gas film, and said contour being formed into said flexible material by said vacuum means out-of-contact with said body.

19. Means for controlling a gas film as defined in claim 18, in which said opening is a slot preceding said area, said slot having a dimension coextensive with the width of the area on said flexible web having the controlled spacing from said continuous surface on said body.

20. Means as defined in claim 19 in which the remaining surface dimension of said slot is small to the extent of avoiding damage to said flexible material when there is no relative movement.

21. Means for controlling a gas film as defined in claim 20, in which said opening is rectilinear on the surface of said body.

22. Means for controlling a gas film as defined in claim 18, in which a plurality of openings are formed through said body prior to said controlled gas film.

23. Means for controlling a gas film as defined in claim 22, in which said plurality of openings are parallel to each other.

24. Means as defined in claim 18 in which said relative motion can be in either forward or backward directions, comprising at least a second opening effective for reverse relative motion, said second opening being formed through said body on the opposite side of said continuous surface from said first-mentioned effective opening, and second means for applying the lower-than-ambient gas pressure to said second opening.

25. Means as defined in claim 24, further including valve control means for applying said lower-than-ambient pressure selectively to the slots at opposite ends of said continuous area.

References Cited

UNITED STATES PATENTS

| | | | |
|---|---|---|---|
| 2,778,634 | 1/1957 | Gams | 226—95 |
| 2,905,768 | 9/1959 | Cronquist | 179—100.2 |

M. HENSON WOOD, Jr., *Primary Examiner.*

R. A. SCHACHER, *Assistant Examiner.*